(12) United States Patent
Shimasaki et al.

(10) Patent No.: US 6,185,931 B1
(45) Date of Patent: Feb. 13, 2001

(54) FAILURE DETECTING SYSTEM OF EXHAUST PURIFICATION APPARATUS

(75) Inventors: Yuichi Shimasaki; Hiroaki Kato, both of Saitama (JP)

(73) Assignee: Honda Giken Kabushiki Kaisha, Tokyo (JP)

(*) Notice: Under 35 U.S.C. 154(b), the term of this patent shall be extended for 0 days.

(21) Appl. No.: 09/365,823

(22) Filed: Aug. 3, 1999

(30) Foreign Application Priority Data

Aug. 7, 1998 (JP) .................................................. 10-224466

(51) Int. Cl.[7] ........................................................ F01N 3/00
(52) U.S. Cl. ................................ 60/277; 60/286; 60/289; 60/303
(58) Field of Search .............................. 60/277, 290, 300, 60/303, 307, 286, 289

(56) References Cited

U.S. PATENT DOCUMENTS

| | | | |
|---|---|---|---|
| 5,444,978 | * 8/1995 | Yoshizaki et al. | 60/284 |
| 5,615,552 | * 4/1997 | Shimasaki et al. | 60/277 |
| 5,689,952 | * 11/1997 | Kato et al. | 60/277 |
| 5,782,086 | * 7/1998 | Kato et al. | 60/274 |
| 5,806,307 | * 9/1998 | Aoki et al. | 60/277 |

FOREIGN PATENT DOCUMENTS

| | | |
|---|---|---|
| 9-21313 | 1/1997 | (JP) . |
| 9-60554 | 3/1997 | (JP) . |

* cited by examiner

*Primary Examiner*—Thomas Denion
*Assistant Examiner*—Binh Tran
(74) *Attorney, Agent, or Firm*—Armstrong, Westerman, Hattori, McLeland & Naughton

(57) ABSTRACT

A failure detecting system of an exhaust purification apparatus includes, a catalyst unit including an electrically heated catalyst and intervened in an engine exhaust path, an air pump supplying a secondary air to the engine exhaust path, a first electric current sensor detecting electric current value for the electrically heated catalyst, and a second electric current sensor detecting electric current value for the air pump. The electrically heated catalyst and air pump are supplied with current upon a cold start of an engine. Presence of failures in the electrically heated catalyst and air pump is discerned on the basis of the electric current value each of the first and second electric current sensors, and the detection of the current value of the first electric current sensor starts prior to the detection of the current value of the second electric current sensor.

4 Claims, 4 Drawing Sheets

FAILURE DETECTING SYSTEM OF EXHAUST PURIFICATION APPARATUS

BACKGROUND OF THE INVENTION

1. Field of the Invention

The present invention relates to a failure detecting system of an exhaust purification apparatus, having a catalyst unit, inclusive of an electrically heated catalyst, that is inserted in an engine exhaust path and an air pump for supply of secondary air to the exhaust path in such a manner that current is supplied to a structure as the electrically heated catalyst and the air pump, upon cold start of the engine.

2. Description of the Related Art

Conventionally known as this kind of failure detecting system is an electric current sensor for detection of current value supplied to the electrically heated catalyst and an electric current sensor for detection of current value supplied to the air pump, wherein presence of failures in the electrically heated catalyst and air pump are discerned on the basis of electric current value detected by these electric current sensors (See Japan Patent Unexamined Publication No. Hei. 9-60554).

Immediately after the air pump is started, the electrical current increases temporarily under the influences of inertia mass and startup character of the air pump, and stabilization of the electric current takes a certain duration of time. Therefore, in the above-described conventional type, after the start of supply of current to the electrically heated catalyst and the air pump, a certain duration of time has been retained for a waiting time as required to stabilize the electric current for the pump, and then the detection of electric current value for the electrically heated catalyst and the detection of electric current value for the air pump are simultaneously started.

In order to secure durability of the electrically heated catalyst, supply of current to the electrically heated catalyst is stopped if the engine rotation frequency or vehicle speed exceeds a predetermined value even at the cold start. If a driver, however, attempts to start driving a car immediately after beginning of the startup, supply of current to the electrically heated catalyst is stopped because the engine rotation frequency or vehicle speed has exceeded the predetermined value before expiration of necessary duration of detection time after the start of detecting the electric currents for the electrically heated catalyst and the air pump, and thus discernment of failures of the electrically heated catalyst cannot be carried out.

Further, a conventionally known engine exhaust purification apparatus is provided with a catalyst unit which contains an electrically heated catalyst that is inserted in the engine exhaust path. The electrically heated catalyst is supplied with current upon cold start of the engine to facilitate exhaust purifying reaction in the catalyst unit for improvement in the exhaust emission at the cold start (Japanese Patent Unexamined Publication No. Hei. 9-21313).

Also known is the one provided with a failure detecting means in which, after detection of current value supplied to the electrically heated catalyst, an integrated power amount that has been applied to the electrically heated catalyst is calculated on the basis of the detected electric current value so as to be utilized as a parameter representing the generated heat amount of the electrically heated catalyst, and an electrically heated catalyst failure is discerned if the integrated power amount is not within a predetermined allowable range.

If the electrically heated catalyst is supplied with current when the engine temperature is substantially lower than the normal temperature, a heat shock which incurs bad influence in the durability thereof is liable to occur in the electrically heated catalyst.

SUMMARY OF THE INVENTION

In view of the above described problem, the object of the invention is to provide a failure detecting system of an exhaust purification apparatus wherein a frequency of disabled discernment of failure in the electrically heated catalyst is reducible so far as possible.

A failure detecting system of an exhaust purification apparatus includes, a catalyst unit including an electrically heated catalyst and intervened in an engine exhaust path, an air pump supplying a secondary air to the engine exhaust path, a first electric current sensor detecting electric current value for the electrically heated catalyst, and a second electric current sensor detecting electric current value for the air pump. The electrically heated catalyst and air pump are supplied with current upon a cold start of an engine. Presence of failures in the electrically heated catalyst and air pump is discerned on the basis of the electric current value each of the first and second electric current sensors, and the detection of the current value of the first electric current sensor starts prior to the detection of the current value of the second electric current sensor.

DETAILED DESCRIPTION OF THE PREFERRED EMBODIMENTS

First Embodiment

Figure 1:
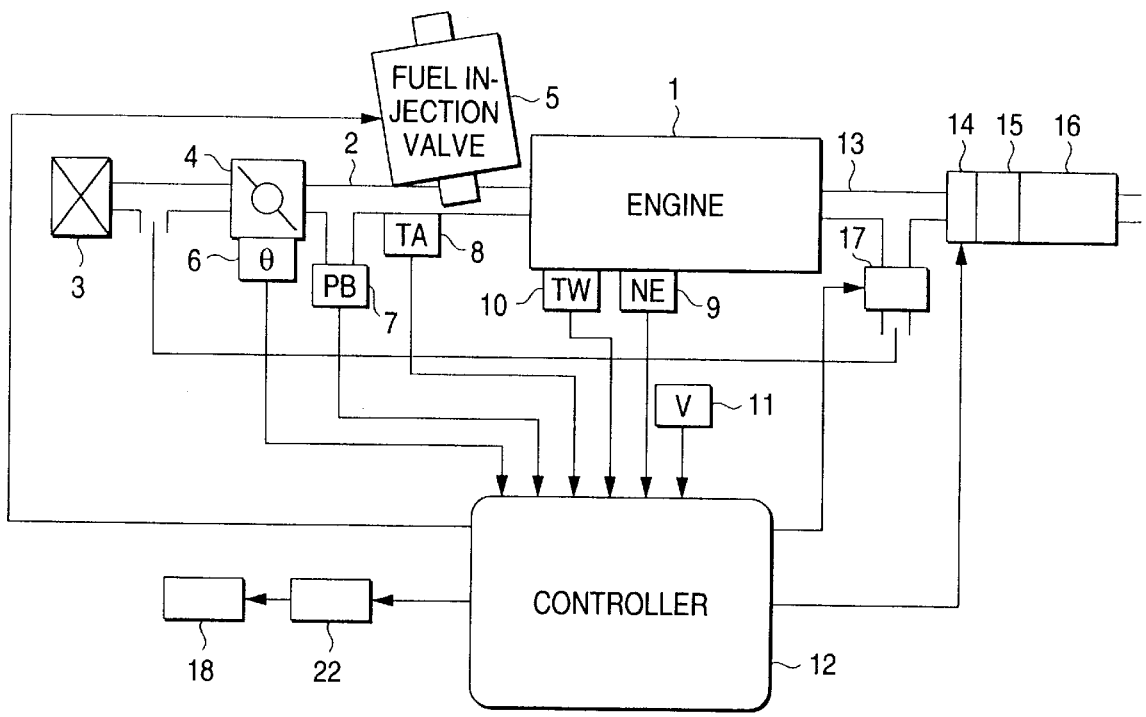
FIG. 1 is a block diagram showing the engine control system with an exhaust purification apparatus having a failure detecting system according to the invention.

With reference to FIG. 1, reference numeral 1 designates an engine for a vehicle, and in an intake air path 2 of the engine 1, in order from the upstream side, there is provided an air cleaner 3, a throttle valve 4, and fuel injection valve 5. With input of signals from a sensor 6 for detection of the throttle opening degree θ, a sensor 7 for detection of the intake air negative pressure PB, a sensor 8 for detection of the intake air temperature TA, a sensor 9 for detection of the engine revolution speed NE, a sensor 10 for detection of the engine cooling water temperature TW and a sensor 11 for detection of the vehicle velocity V into a controller 12 comprising of an onboard computer, the controller 12 controls the fuel injection amount from the fuel injection valve 5 according to the signals from the sensors.

In an exhaust path 13 of the engine 1 there is provided a catalyst unit including an electrically heated catalyst (hereinafter referred to as an EHC) 14 that functions as a heater that generates heat by supplying current, a starting catalyst 15 that is mainly in charge of exhaust purification immediately after start of the engine and a three-way catalyst 16. Further, an air pump 17 is connected to a part of an exhaust path 13 on the upstream side of the catalyst unit so as to supply air from the intake air path 2 between the air cleaner 3 and the throttle valve 4 to the exhaust path 13 as secondary air by the air pump 17.

Figure 2:
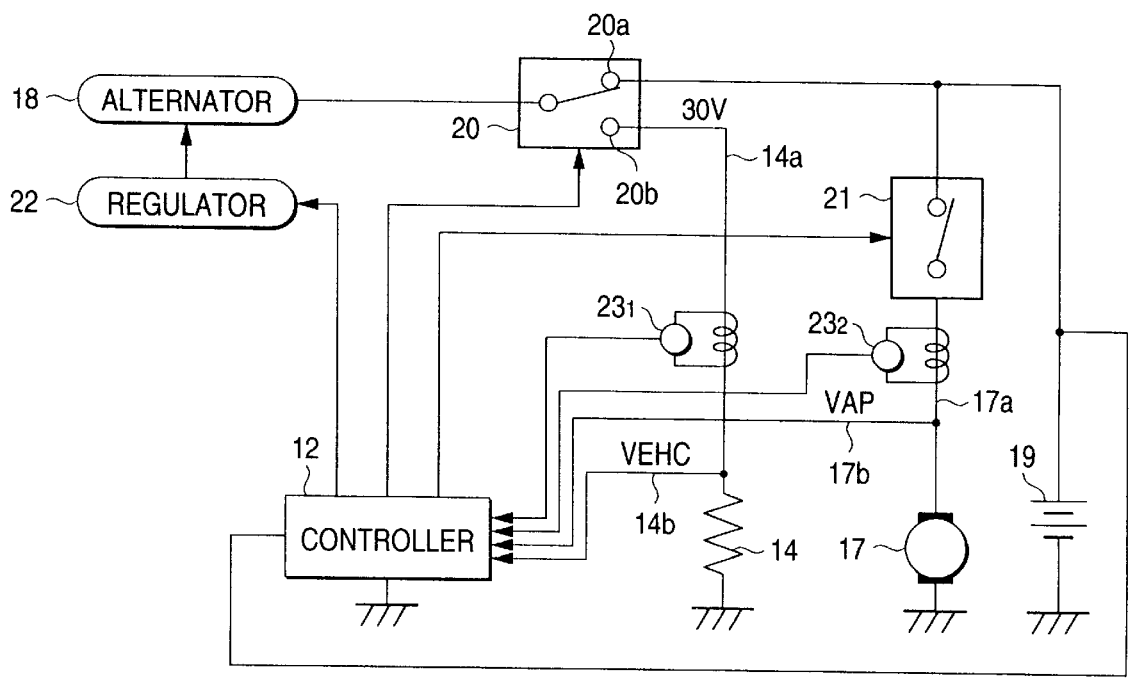
FIG. 2 is a circuit diagram showing the failure detecting system according to a first embodiment of the invention.

Supply of current of the EHC 14 and the air pump 17 is controlled with a circuit shown in FIG. 2. That is, a changeover switch 20 which has a normally-closed contact 20a for connection of an onboard battery 19 is provided on the output side of an alternator 18 driven by the engine 1 while the EHC 14 is connected to a normally-open contact 20b of the changeover switch 20. The air pump 17 is connected to the normally-closed contact 20a of the changeover switch 20 via an on-off switch 21. The controller 12 controls switching of the changeover switch 20 and the on-off switch 21 and, the EHC 14 and the air pump 17 is supplied with current when the on-off switch 21 is turned on with the normally-open contact 20b of the changeover switch 20 being closed. The controller 12 controls a regulator 22 which varies the output voltage of the alternator 18 in such a manner that the output voltage from the alternator 18 is set to be relatively low (ex. 14.5 V) when the normally-closed contact 20a of the changeover switch 20 is closed while the output voltage from the alternator 18 is set to be relatively high (ex. 30V) when the normally-open contact 20b of the changeover switch 20 is closed.

A connection circuit 14a between the changeover switch 20 and the EHC 14 and a connection circuit 17a between the open-close switch 21 and the air pump 17 are respectively provided with electric current sensors $23_1$ and $23_2$, and after detection of the current value IEHC supplied to the EHC 14 (hereinafter referred to as heater current) by the electric current sensor $23_1$, and detection of the current value IAP supplied to the air pump 17 (hereinafter referred to as pump current) by the electric current sensor $23_2$. With input of the detection signals from the electric current sensors $23_1$ and $23_2$ into the controller 12, voltage signal lines 14b and 17b which are branched from the connection circuits 14a and 17a are connected to the controller 12, so that the controller 12 can detect the applied voltage VEHC to the EHC 14 (hereinafter referred to as heater voltage) and the applied voltage VAP to the air pump 17 (hereinafter referred to as pump voltage).

Figure 3:
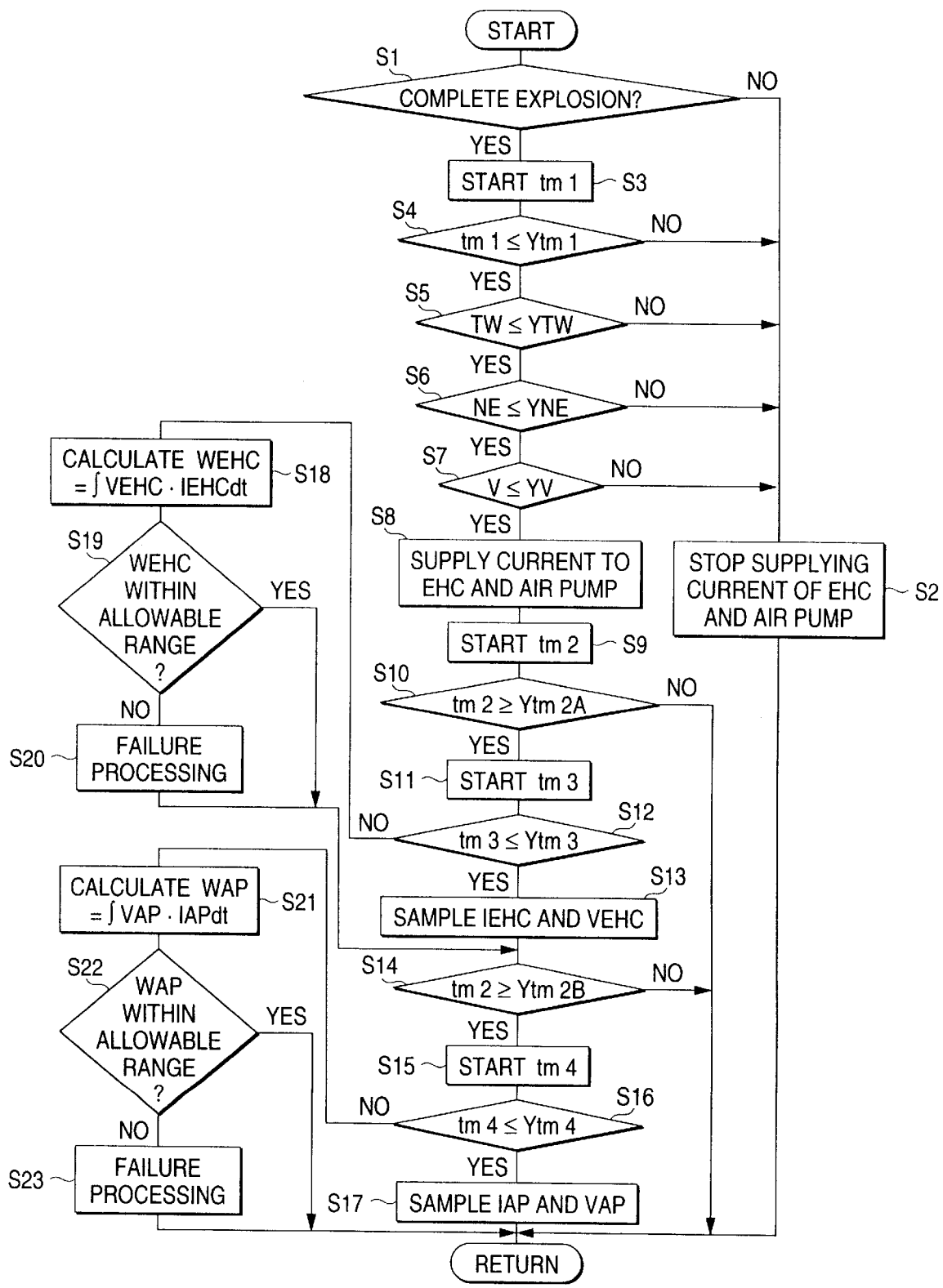
FIG. 3 is a flowchart showing a current supply control program for the electrically heated catalyst and the air pump according to the first embodiment of the invention.

FIG. 3 shows a current supply control program for the EHC 14 and the air pump 17, executed by the controller 12. First, at step S1, whether or not an explosion has completed in the engine 1 is discerned. If the explosion has not completed yet, step S2 is performed to close the normally-closed contact 20a of the changeover switch 20 and also to turn off the on-off switch 21, without supplying current to the EHC 14 and the air pump. After the complete explosion, at step S3, the timing action of a first timer tm1 is started and then, at step S4, whether or not the timing result of the first timer tm1, that is, the lapsed time after complete explosion, is within a setup time Ytm1 (ex. 60 seconds) is discerned. If tm1≦Ytm1, at step S5, whether or not water temperature TW is a predetermined value YTW (ex. 50° C.) of a criterion for cooling state or less is discerned. If TW≦YTW, at step S6, whether or not the engine revolution speed NE is a predetermined value YNE (ex. 2,500 rpm) or less is discerned. If NE≦YNE, at step S7, whether or not the vehicle velocity V is a predetermined value YV (ex. 40 km/h) or less is discerned. If V≦YV, step S8 is performed to close the normally-open contact 20b of the changeover switch 20 and also to turn on the on-off switch 21, to thereby supply current to the EHC 14 and the air pump 17.

On the other hand, in a case of tm1>Ytm1, TW>YTW, NE>YNE or V>YV, the step S2 is performed to stop supplying current to the EHC 14 and the air pump 17. Thus, the EHC 14 and the air pump 17 are supplied with current under the conditions NE≦YNE and V≦YV for a certain duration of time at the cold start.

While the EHC and the air pump are supplied with current, at step S9, a second timer tm2 starts timing action and then, at step S10, whether or not the timing result of the second timer tm2, that is, the lapsed time after start of supplying of current to the EHC 14 and the air pump 17, is within a first setup time Ytm2A is discerned. If tm2≧Ytm2A, at step S11, a third timer tm3 starts timing action and then, at step S12, whether or not the timing result of the third timer tm3 is a predetermined setup time Ytm3 (ex. 10 seconds) or less is discerned. If Tm3≦Ytm3, at step S13, the heater current IEHC and the heater voltage VEHC are sampled. At step S14, whether or not the timing result of the second timer tm2 has reached a predetermined second setup time Ytm2B is discerned. If tm2≧Ytm2B is realized, at step S15, a fourth timer tm4 starts timing action and then, at step S16, whether or not the timing result of the fourth timer tm4 is a predetermined setup time Ytm4 (ex. 10seconds) or less is discerned. If Tm4≦Ytm4, at step S17, the pump current IAP and the pump voltage VAP are sampled.

If at step S12, tm3>Ytm3 is discerned, at step S18, WEHC=∫VEHC·IEHCdt, an integrated heater power that has been applied on the EHC 14 during the sampling time Ytm3 is calculated. Then, at step S19, whether or not WEHC is within the predetermined allowable range is discerned; if not, the EHC 14 is discerned as failure and, at step S20, a failure processing, such as illumination of a failure indicator lamp for the EHC 14, is performed. If Tm4>Ytm4 is discerned at step S16, WAP =∫VAP·IAPdt, an integrated pump power that has been applied to the air pump during the sampling time Ytm4, is calculated at step S21 and, at step S22, whether or not WAP is within the predetermined allowable range is discerned; if not, the air pump 17 is discerned as failure, at step S23, a failure processing, such as illumination of a failure indicator lamp for the air pump 17, is performed.

Figure 4:
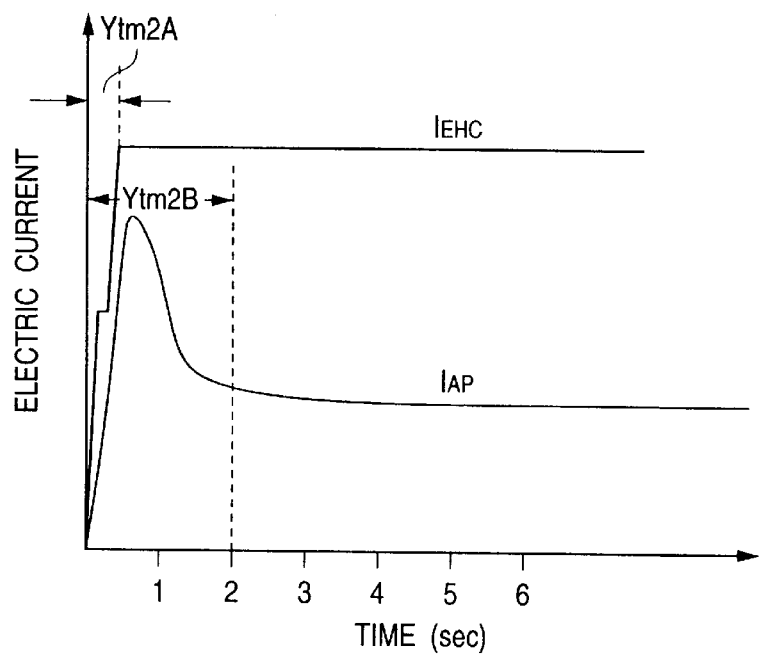
FIG. 4 is a diagrammatic chart showing variation characters of the electric current IEHC for the electrically heated catalyst and the electric current IAP for the air pump.

If the EHC 14 and the air pump 17 are supplied with current, as shown in FIG. 4, under the influence of inertia mass and startup character of the air pump 17, the pump current IAP increases immediately after supply of current so as to form a peak, and stabilization of the pump current IAP takes a certain duration of time. Since the start of the sampling of the pump current IAP before the stabilization of the IAP possibly causes erroneous detection, the above-described second setup time Ytm2B is set up so as to match the duration of time required for stabilization of the IAP, for example, 2 seconds. On the other hand, since the heater current IEHC stabilizes promptly, the above-described setup time Ytm2A is set up so as to be shorter than the second setup time Ytm2B, for example, 0.5 seconds. In this way, even if supply of current to the EHC 14 and the air pump 17 may be stopped by early establishment of the NE>YNE and V>YV state which is caused by the start of driving immediately after beginning of the startup, the frequency of current supply stop before Ytm3 sampling time is lapsed, that is, the frequency of disabled discernment of failure in the EHC 14 is reducible so far as possible since the heater current IEHC sampling starting time has been advanced.

Although, in the first embodiment, the existence of the failure is discerned on the basis of the integrated electric powers WEHC and WAP which are applied during the sampling time, the existence of the failure may be discerned on the basis of the integrated value or mean value of the electric currents IEHC and IAP which are supplied during the sampling time if stability of the voltages VEHC and VAP can be assured.

As elucidated with the explanation above, since current value detection starting time of the electrically heated catalyst has been advance, the frequency of disabled discernment of failures in the electrically heated catalyst is reduced so far as possible.

Second Embodiment

A description will be given of a second embodiment which prevents the durability degradation of the electrically heated catalyst caused by a heat shock. The control system of the second embodiment is used with the system shown in FIG. 1 as well as the first embodiment. Thus, the portions identical to the first embodiment are referred to by common symbols.

Figure 5:
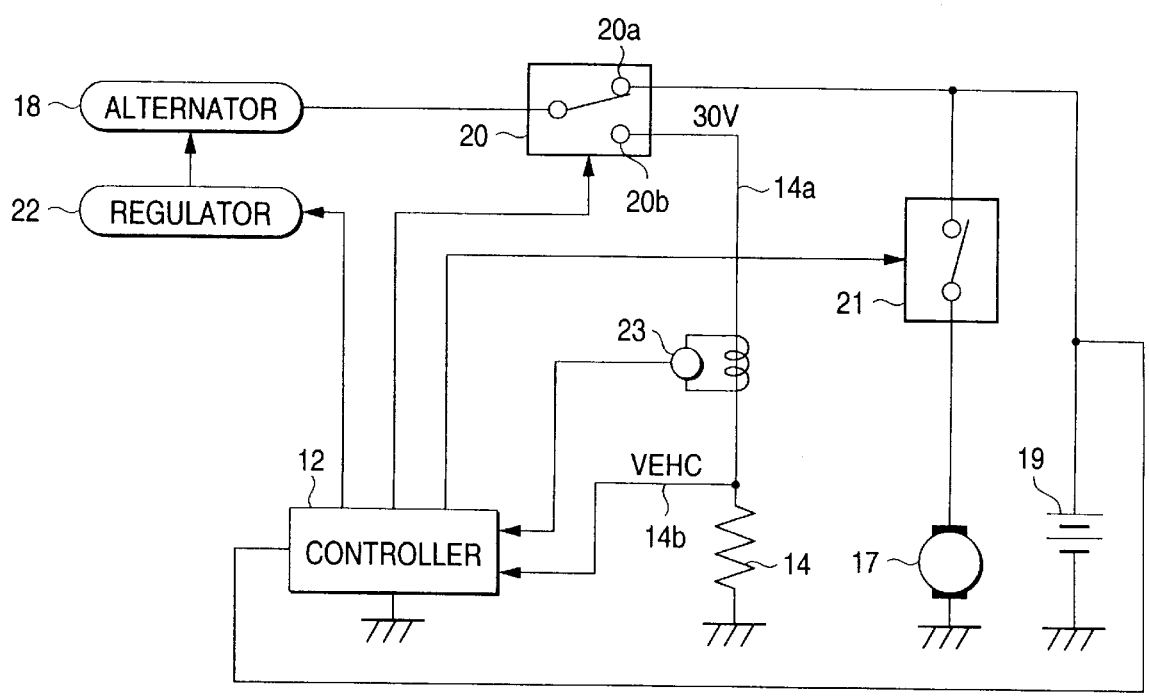
FIG. 5 is a circuit diagram showing the failure detecting system according to a second embodiment of the invention.
Figure 6:
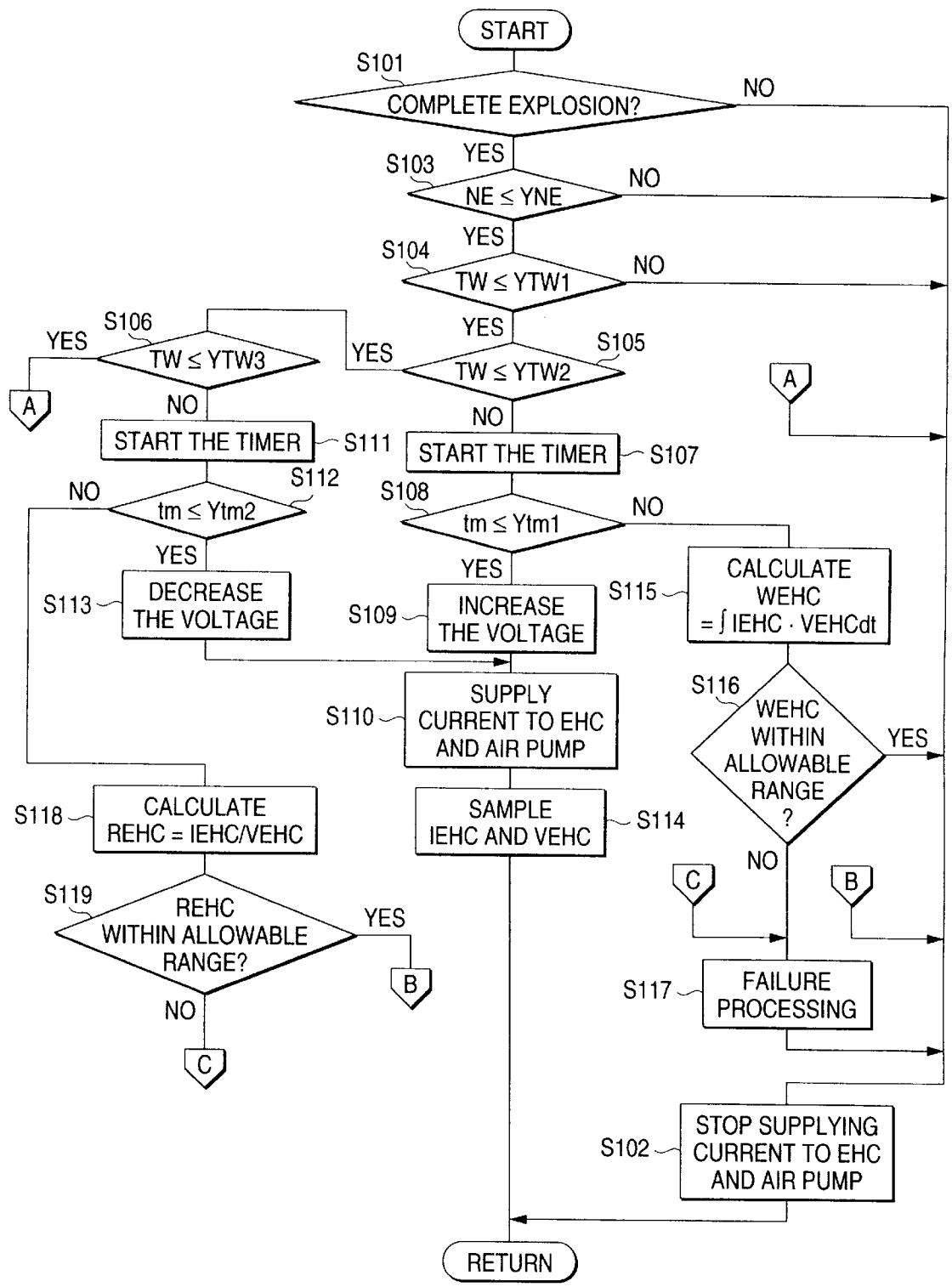
FIG. 6 is a flowchart showing a current supply control program for the electrically heated catalyst according to the second embodiment of the invention.

Supply of current to the EHC 14 and the air pump 17 is controlled with a circuit shown in FIG. 5. That is, a changeover switch 20 which has a normally-closed contact 20a for connection of an onboard battery 19 is provided on the output side of an alternator 18 drivenby the engine 1 while the EHC 14 is connected to a normally-open contact 20b of the changeover switch 20. The air pump 17 is connected to the normally-closed contact 20a of the changeover switch 20 via an on-off switch 21. The controller 12 controls switching of the changeover switch 20 and the on-off switch 21 and, the EHC 14 and the air pump 17 is supplied with current when the on-off switch 21 is turned on with the normally-open contact 20b of the changeover switch 20 being closed. The controller 12 controls a regulator 22 which varies the output voltage of the alternator 18 in such a manner that the output voltage from the alternator 18 is set to be relatively low (ex. 14.5 V) when the normally-closed contact 20a of the changeover switch 20 is closed while the output voltage from the alternator 18 is set to be relatively high (ex. 30 V) when the normally-open contact 20b of the changeover switch 20 is closed.

A connection circuit 14a between a changeover switch 20 and an EHC 14 is provided with an electric current sensor 23 and, after detection of the current value IEHC of the EHC 14 by the electric current sensor 23 and with input of the detection signal from the electric current sensors 23 into the controller 12, voltage signal line 14b which is branched from the connection circuit 14a is connected to the controller 12 so that the controller 12 can detect the applied voltage VEHC at the EHC 14.

The current supply control of the EHC 14 and the air pump 17 is carried out according to a program shown in FIG. 3 with utilization of the following setup temperatures. The first setup temperature YTW1 is set up on the upper limit temperature of the temperature range where the EHC 14 requires to be heated (ex. 50° C.), as a determined value regarding the engine temperature, that is, water temperature TW. The second setup temperature YTW2 is set up on the temperature where degradation of durability caused by a heat shock on the EHC 14 is liable to occur (ex. 5° C.). The third setup temperature YTW3 is set up on the temperature where supply of current to the EHC 14 is disabled for reason of durability (ex. −7° C.).

To describe this in details, first, at step S101, whether or not an explosion has completed in the engine 1 is discerned. If the explosion has not completed yet, step S102 is performed to close the normally-closed contact 20a of the changeover switch 20 and also to turn off the on-off switch 21, without supplying current to the EHC 14 and the air pump 17. After the complete explosion, at step S103, whether or not the engine revolution speed NE is the predetermined value YNE (ex. 2,500 rpm) or less is discerned. If NE≦YNE, at step S104, whether or not the water temperature TW is the first setup temperature YTW1 or lower is discerned. Then, if TW≦YTW1, at step S105, whether or not the water temperature TW is the second setup temperature YTW2 or lower is discerned. If TW≦YTW2, at step S106, whether or not the water temperature TW is the third setup temperature YTW3 or lower is discerned.

If YTW2<TW≦YTW1, step S107 is performed after the step S105 so as to start the timing action of the timer and then, at step S108, whether or not the timing result of the timer tm is within a first setup time Ytm1 (ex. 60 seconds) is discerned. If tm≦Ytm1, at step S109, the output voltage of an alternator 18 is increased and, at step S110, the normally-open contact 20b of the changeover switch 20 is closed and also the on-off switch 21 is turned on, to thereby supply current to the EHC 14 and the air pump 17.

If YTW3<TW≦YTW2, step S111 is performed after the step S106 so as to start the timing action of the timer and then, at step S112, whether or not the timing result of the timer tm is within a second setup time Ytm2 (ex. 5 seconds) which is setup to be shorter than the Ytm1 is discerned. If tm≦Ytm2, at step S113, the output voltage of the alternator 18 is decreased, and then, step S110 is performed to thereby supply current to the EHC 14 and the air pump 17.

If the discernment at step S103 is NE>YNE, or if the discernment at step S104 is TW>YTW1, or the discernment at step S106 is TW≦YTW3, step S102 is performed while, if the discernment at step S108 is tm>Ytm1, or if the discernment at step S102 is tm>Yte2, step S2 is performed after a failure processing to be described below to stop supplying current to the EHC 14 and the air pump 17. Therefore, the EHC 14 and the air pump 17 are supplied with current for the duration of Ytml if YTW2<TW≦YTW1 and for the duration of Ytm2 if YTW3< TW≦YTW2 at the cold start of the engine 1.

Since the current supplying time is shorter and the heater voltage VEHC is smaller at low temperatures where YTW3<TW ≦YTW2 than at normal temperatures where YTW2<TW≦YTW1, the applied power amount to the EHC 14 is reduced and thus the durability degradation that results from the heat shock on the EHC 14, which is liable to occur at low temperatures can be prevented.

While being supplied with current, at step S114, the heater current IEHC and the heater voltage VEHC are sampled and, if tm>Ytm1 was discerned at step S108, at step S115, WEHC =∫IEHC·VEHCdt, an integrated heater power that has been applied to the EHC 14 is calculated and then, at step S16, whether or not WEHC is within the predetermined allowable range is discerned. If it is within the allowable range, step S102 is performed straight, but if not, the EHC 14 is discerned as failure and, after the failure processing at step S117, such as illumination of a failure indicator lamp for the EHC 14, the step S102 is performed. If tm>Ytm2 is discerned at step S112, REHC=IEHC/VEHC, a resistance value of the EHC 14, is calculated at step S118 and, at step S119, whether or not REHC is within the predetermined allowable range is discerned. If it is within the allowable range, step S102 is performed, but if not, after the failure processing at step S117, the step S2 is performed. The resistance value REHC can be calculated from a sampling data for a short period of time and thus the failure discernment can be carried out even if the current supplying time is shortened at the time of low temperatures.

Although, in the second embodiment, at the time of low temperature, the current supplying time is shortened and also the heater voltage VEHC is lowered, it can be conducted only with either current supplying time reduction or the decrease in the heater voltage VEHC. An alternative is to vary the current supplying time or the heater voltage VEHC in correspondence to the water temperature TW so that they decrease as the water temperature TW decreases.

As elucidated with the explanation above, since the power amount applied to the electrically heated catalyst at low temperatures is reduced, the invention can prevent the degradation of durability caused by the heat shock on the electrically heated catalyst. Moreover, shift of the data for failure discernment from the integrated power amount to the resistance value enables the failure discernment with current supply for a short period of time at low temperatures. In this connection, although the exhaust purifying efficiency of the catalyst unit decreases when the amount of power electrified on the electrically heated catalyst decreases, this causes no special problems since any serious air contamination such as photochemical smog will not occur at low temperatures.

The present disclosure relates to the subject matter contained in Japanese patent application Nos. Hei. 10-224466 filed on Aug. 7, 1998 and Hei. 10-224468 filed on Aug. 8, 1998 which are expressly incorporated herein by reference in its entirety.

While only certain embodiments of the invention have been specifically described herein, it will apparent that numerous modification may be made thereto without departing from the spirit and scope of the invention.

What is claimed is:

1. A failure detecting system of an exhaust purification apparatus, comprising:
   a catalyst unit including an electrically heated catalyst and intervened in an engine exhaust path;
   an air pump supplying a secondary air to said engine exhaust path, said electrically heated catalyst and air pump being supplied with current upon a cold start of an engine;
   a first electric current sensor detecting electric current value for said electrically heated catalyst; and
   a second electric current sensor detecting electric current value for said air pump,
   wherein presence of failures in said electrically heated catalyst and air pump is discerned on the basis of the electric current value each of said first and second electric current sensors, and
   the detection of the current value of said first electric current sensor starts prior to the detection of the current value of said second electric current sensor.

2. A failure detecting system of an exhaust purification apparatus, comprising:
   a catalyst unit including an electrically heated catalyst and intervened in an engine exhaust path;
   an air pump supplying a secondary air to said engine exhaust path, said electrically heated catalyst and air pump being supplied with current upon a cold start of an engine;
   a first electric current sensor detecting electric current value for said electrically heated catalyst; and
   a second electric current sensor detecting electric current value for said air pump,
   wherein presence of failures in said electrically heated catalyst and air pump is discerned on the basis of the electric current value each of said first and second electric current sensors, and
   the discernment of failure of said electrically heated catalyst starts prior to the discernment of failure of said air pump.

3. A failure detecting system of an exhaust purification apparatus according to claim 1, wherein said electrically heated catalyst is supplied with current upon the cold start of the engine in which the engine temperature is a first setup temperature or lower, and
   there is provided an electric power reducing unit reducing power amount applied to the electrically heated catalyst to be smaller than the power amount applied thereto at the time of the engine temperature higher than a second setup temperature, when the engine temperature is not higher than said second setup temperature being lower than said first setup temperature.

4. A failure detecting system of an exhaust purification apparatus according to claim 3, further comprising:
   a first failure detecting unit calculating an integrated power amount applied to said electrically heated catalyst on the basis of the current value of said first electric current sensor when the engine temperature is higher than said second setup temperature, and determining the failure of said electrically heated catalyst if the integrated power amount is not within a predetermined allowable range; and
   a second failure detecting unit means calculating a resistance value of the electrically heated catalyst on the basis of the current value of said first electric current sensor when the engine temperature is not higher than said second setup temperature, and determining the failure of said electrically heated catalyst if the resistance value is not within a predetermined allowable range.

* * * * *